United States Patent
Fujii et al.

(10) Patent No.: US 7,305,313 B2
(45) Date of Patent: Dec. 4, 2007

(54) QUALITY VARIATION DISPLAY DEVICE, QUALITY VARIATION DISPLAY METHOD, QUALITY VARIATION DISPLAY PROGRAM, AND STORAGE MEDIUM STORING SUCH PROGRAM

(75) Inventors: Toru Fujii, Kyoto (JP); Shiro Sugihara, Kyoto (JP)

(73) Assignee: Omron Corporation, Kyoto-Shi (JP)

( * ) Notice: Subject to any disclaimer, the term of this patent is extended or adjusted under 35 U.S.C. 154(b) by 29 days.

(21) Appl. No.: 11/311,639

(22) Filed: Dec. 20, 2005

(65) Prior Publication Data

US 2006/0167579 A1    Jul. 27, 2006

(30) Foreign Application Priority Data

Jan. 24, 2005   (JP)   ............................. 2005-016107
Mar. 29, 2005   (JP)   ............................. 2005-096381

(51) Int. Cl.
G06F 19/00   (2006.01)
(52) U.S. Cl. ...................................................... 702/81
(58) Field of Classification Search .................. 702/81
See application file for complete search history.

(56) References Cited

U.S. PATENT DOCUMENTS 6,622,101 B1 * 9/2003 Oechsner et al. ............. 702/84

6,801,822 B1 * 10/2004 Fujiwara et al. ............ 700/108

FOREIGN PATENT DOCUMENTS

JP   2003-295925   10/2003

* cited by examiner

Primary Examiner—Michael P. Nghiem
Assistant Examiner—Cindy D. Khuu
(74) Attorney, Agent, or Firm—Foley & Lardner LLP

(57) ABSTRACT

A quality variation display device that can surely identify periodic information about quality on a product number basis such as the occurrence of a failure for every prescribed number of products is provided. The device includes a quality data storing database that stores the measurement result of each product measured by a measuring unit in association with the manufacturing order, an interval statistic calculation portion that shifts an interval corresponding to a prescribed number of products by a prescribed shift number of products, obtains a statistic for each of the intervals, and produces a graph representing the statistics in the manufacturing order at equal intervals, and a display portion that displays the graph.

9 Claims, 11 Drawing Sheets

Fig.3

QUALITY DATA CORRESPONDING TO 1ST MEASURING UNIT 5

| MEASURING TIME | MEASURING ITEM 5a | MEASURING ITEM 5b | ... |
|---|---|---|---|
| 08:51:54 | 52.3 | 10.1 | ... |
| 08:52:51 | 49.8 | 9.7 | ... |
| 08:54:03 | 50.4 | 12.5 | ... |
| ... | ... | ... | ... |

Fig.4

MANUFACTURING DATA CORRESPONDING TO 1ST MANUFACTURING UNIT 3

| OCCURRENCE TIME | PRODUCTION CONDITION INFORMATION | | · OPERATION CONTENT INFORMATION |
|---|---|---|---|
| | CHANGED PRODUCTION INFORMATION | NEW PRODUCTION CONDITION | |
| 09:36:08 | MOLDING DIE | #3 | — |
| 10:04:56 | — | — | POSITIONAL ADJUSTMENT OF JIG |
| 13:11:32 | — | — | DUST CLEANING OF TOOL |
| ... | ... | ... | ... |

Fig.5

| TIME DATA | | |
|---|---|---|
| TIME ON MEASURING TIME SCALE | POSITIONAL COORDINATES ON PRODUCT NUMBER BASED SCALE | |
| | 1ST MEASURING UNIT 5 | 2ND MEASURING UNIT 7 |
| 09:00:00 | 9.8 | 10.6 |
| 10:00:00 | 68.5 | 70.1 |
| 11:00:00 | 130.7 | 131.9 |
| ... | ... | ... |

CAUSALITY/DEAD TIME INFORMATION CORRESPONDING TO 1ST MEASURING UNIT 5

| NAME OF MANUFACTURING UNIT | MEASURING ITEM | | |
|---|---|---|---|
| | 5a | 5b | ... |
| 1ST MANUFACTURING UNIT 3 | -1 | 9 | ... |
| 2ND MANUFACTURING UNIT 4 | 3 | -1 | ... |
| 3RD MANUFACTURING UNIT 6 | -1 | -1 | ... |
| ... | ... | ... | ... |

(b)

CAUSALITY/DEAD TIME INFORMATION CORRESPONDING TO 2ND MEASURING UNIT 7

| NAME OF MANUFACTURING UNIT | MEASURING ITEM | | |
|---|---|---|---|
| | 7a | 7b | ... |
| 1ST MANUFACTURING UNIT 3 | -1 | 18 | ... |
| 2ND MANUFACTURING UNIT 4 | 12 | -1 | ... |
| 3RD MANUFACTURING UNIT 6 | 4 | 4 | ... |
| ... | ... | ... | ... |

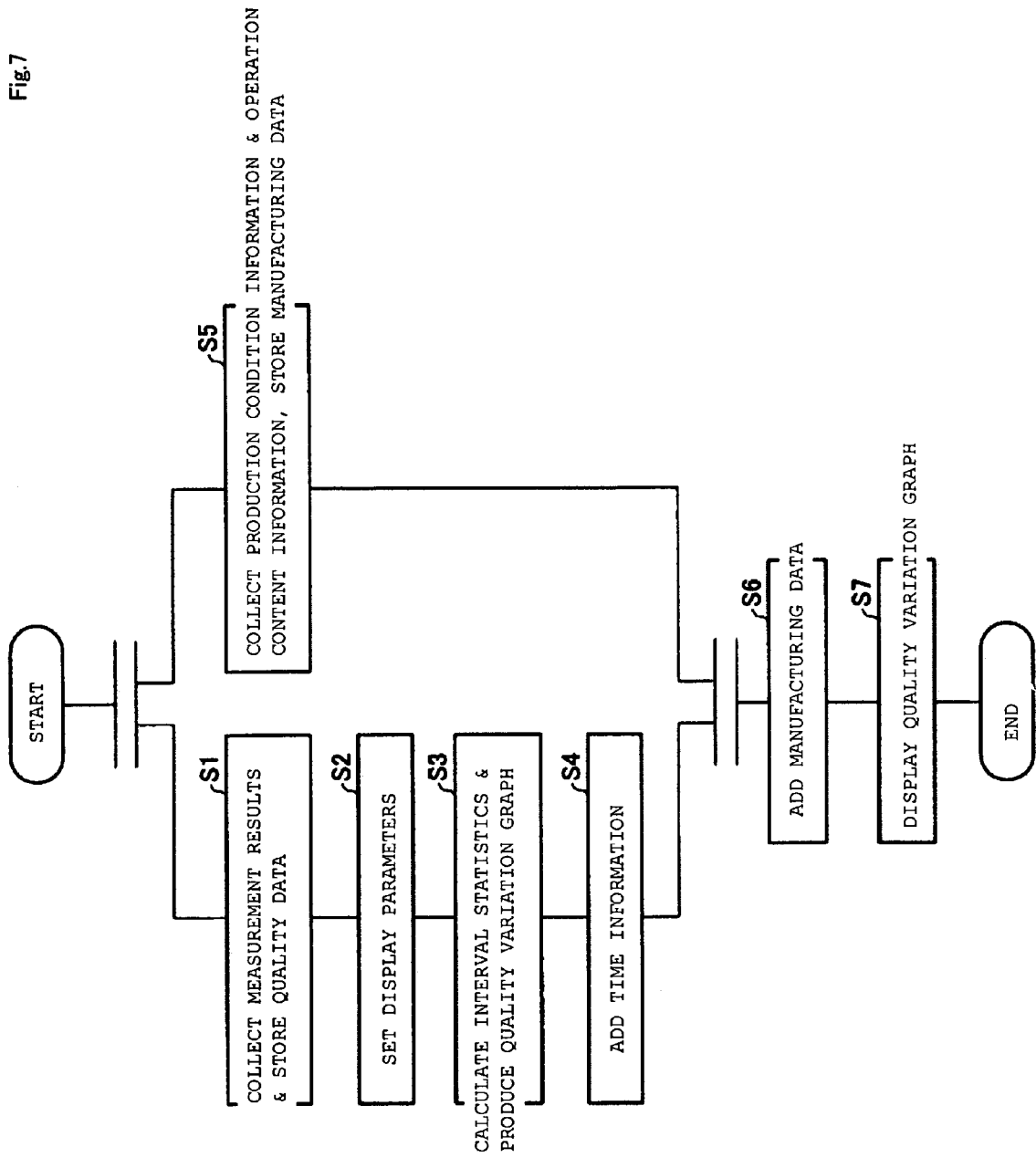

QUALITY VARIATION DISPLAY DEVICE, QUALITY VARIATION DISPLAY METHOD, QUALITY VARIATION DISPLAY PROGRAM, AND STORAGE MEDIUM STORING SUCH PROGRAM

BACKGROUND OF THE INVENTION

1. Field of the Invention

The present invention relates to device and method for displaying quality variation measured in the manufacturing process.

2. Description of the Related Art

Methods of establishing associations between quality characteristic values of products and the contents of operation or production conditions have been proposed in order to control the quality of the products.

Japanese Patent Laid-Open No. H09-219347 (laid open on Aug. 19, 1997) discloses a method of obtaining the correlation between device state data representing the state of a manufacturing device and product data such as the yield and electrical characteristics of products on the basis of the time when the products are manufactured.

Japanese Patent Laid-Open No. 2001-293761 (laid open on Oct. 23, 2001) discloses a method of displaying a production achievement ratio, the presence/absence of the occurrence of abnormalities, the presence/absence of change in molding conditions, and quality data in an injection molding device at multiple screens on a common time axis.

Japanese Patent Laid-Open No. 2004-198148 (laid open on Jul. 15, 2004) discloses a method of displaying the record of quality data, the content of change in production conditions, the content of abnormalities in units, and countermeasures thereto on a common time axis.

Japanese Patent Laid-Open No. 2004-186445 (laid open on Jul. 2, 2004) discloses how conditions in a manufacturing process and product inspection data are combined and the correlation between them is analyzed accordingly.

By the conventional methods described above, production conditions and quality data of products are controlled based on the time axis. However, when individual products are sequentially produced using a manufacturing device, these products are not produced at equal time intervals because of time consumed by abnormalities and recovery from them, change in the production speed according to environmental factors and the like. Similarly, prescribed time after the manufacturing time, quality characteristic values of products cannot be measured at equal intervals among these sequentially manufactured products.

Therefore, when variation in a quality characteristic value is displayed based on the time axis, information indicating the number of products measured within a certain time period is lost.

Now assume that for example the manufacturing device has three equivalent manufacturing processing portions, and these portions sequentially output one product at a time. When one of the processing portions suffers from some failure, a quality characteristic value changes in the ratio of one for every three products. More specifically, the quality characteristic value changes in a cycle of three products. In such a case, by the conventional methods, the variation in the quality characteristic value is displayed based on the time axis, and the information indicating the number of products is lost, so that the information about the cycle is also lost. Consequently, the presence of the failure in one of the manufacturing processing portions cannot immediately be identified.

When the manufacturing device and the quality measuring device are different, it takes some time for products to move from the manufacturing device to the quality measuring device, and therefore associations cannot be established between abnormalities in the quality and conditions concerning the manufacturing device simply because their time axes are matched.

SUMMARY OF THE INVENTION

The present invention is directed to the above-described disadvantages and it is an object of the invention to provide a quality variation display device and a quality variation display method that allow quality periodic information on a product number basis such as the occurrence of a failure for every prescribed number of products to be surely identified, a quality variation display program therefore, and a storage medium storing such a program.

In order to solve the above described disadvantages, the quality variation display device according to the invention displays variation in a prescribed quality in a plurality of products manufactured by a manufacturing unit. The display device includes a quality data storing portion that stores the measuring result of each of the products measured at a measuring unit in association with the manufacturing order, graph producing means for shifting an interval (corresponding to a prescribed number of products consecutive in the manufacturing order) by a prescribed shift number of products, and obtaining a statistic for each of the intervals, thereby producing a graph in which the statistics are displayed at equal intervals in the manufacturing order, and a display portion that displays the graph produced by the graph producing means.

In order to solve the above described disadvantages, a method according to the invention is a method of displaying quality variation in a quality variation display device that displays variation in a prescribed quality in a plurality of products manufactured by a manufacturing unit. The method includes a quality data storing step of storing the measurement result of each of the products measured by a measuring unit in association with the manufacturing order, a graph producing step of shifting an interval (corresponding to a prescribed number of products consecutive in the manufacturing order) by a prescribed shift number of products, and obtaining a statistic for each of the intervals, thereby producing a graph in which the statistics are displayed at equal intervals in the manufacturing order, and a displaying step of displaying the graph produced by the graph producing means.

According to the above described device or method, an interval corresponding to a prescribed number of products consecutive in the manufacturing order is shifted by a prescribed shift number of products, and a statistic for each of the intervals is obtained, so that a graph in which the statistics are displayed at equal intervals in the manufacturing order is produced. In other words, the statistics corresponding to the intervals are displayed at equal intervals. A certain interval and an interval adjacent to this interval are shifted by a prescribed shift number of products. Therefore, the distance between the displayed statistics corresponds to the prescribed shift number of products. In this way, the statistics are plotted on an axis having a prescribed number of products at equal intervals. Consequently, by looking at the graph displayed at the display portion, periodic variation in quality on a product number basis such as the occurrence of a failure for every prescribed number of products can be identified.

By analyzing the displayed graph, a plurality of frequency components in the periodic variation corresponding to various abnormality causes can be identified.

Herein, the statistic refers to for example the measurement results of the number of products themselves when the number of products in each interval is one, and to the average or median of the measurement results when there are a plurality of products in each interval.

When the number of products in each interval is one, and the shift number of products is one, a graph produced by the graph producing means represents the measurement results of the products in the prescribed quality at equal intervals in the manufacturing order.

When the number of products in each interval is more than one, and the statistic is the average of the measurement results of the products included in the interval, the graph produced by the graph producing means represents the moving average of the prescribed quality of the products arranged in the manufacturing order.

Note that the shift number of products corresponds to the difference between the place in the manufacturing order of the product manufactured first among the products included in a certain interval and the place in the manufacturing order of the product manufactured first among the products included in a interval adjacent to the certain interval.

In addition to the above described structure, the measuring unit measures the prescribed quality in the manufacturing order, and the quality data storing portion stores the measurement result in association with its measuring time. The device further includes time information adding means for producing a measuring time axis based on the measuring time stored by the quality data storing portion and adding the measuring time axis to the graph produced by the graph producing means.

In this way, the statistics corresponding to the prescribed quality can be identified at intervals of a prescribed number of products, and the elapse of the measuring time of each of the products can visually be identified. Therefore, for example the measuring time of any large quality variation can be specified on the graph.

In addition to the above described structure, in the quality variation display device according to the invention, the time information adding means adds a scale at prescribed time intervals to the measuring time axis.

The interval between the scale marks is not specified and may be for example one hour or ten minutes. The scale is not limited in its form and may be displayed in the form of lines crossing the axis or lines running to the inside of the graph.

In this way, the size of the length of scale interval on the measuring time axis represents the presence/absence of stagnation in the manufacturing line. More specifically, when the length of the scale interval on the measuring time axis is small, the number of products measured per unit time is small, and this means that there is stagnation in the manufacturing line. Meanwhile, when the length of the scale interval on the measuring time axis is large, the number of products measured per unit time is large, and this means that the flow of the manufacturing line is smooth. In this way, by looking at the size of the length of the scale interval on the measuring time axis, the presence/absence of stagnation in the manufacturing line can easily be identified.

In addition to the above described structure, the quality variation display device according to the invention further includes a manufacturing data storing portion that stores manufacturing data having production condition information indicating change in a production condition at the manufacturing unit and the occurrence time of the change in association with each other or manufacturing data having operation content information indicating the content of operation at the manufacturing unit and the occurrence time of the operation in association with each other, a required time storing portion that previously stores time required from the point of manufacturing at the manufacturing unit to the point of measuring at the measuring unit, and manufacturing data adding means for obtaining adjusted time produced by adding the required time stored by the required time storing portion to the occurrence time in the manufacturing data, and adding the production condition information or the operation content information to said graph based on the adjusted time and the measuring time axis.

Herein, the required time from the point of manufacturing at the manufacturing unit to the point of measuring at the measuring unit refers to the time lag (time difference) between when a certain product starts to be manufactured at the manufacturing unit and when the product starts to be measured at the measuring unit.

In this way, the manufacturing data adding means obtains adjusted time produced by adding the required time to the occurrence time in the manufacturing data, and adds the production condition information or the operation content information to the graph based on the adjusted time and the measuring time axis. Therefore, by looking at the graph, the association between production condition information or operation content information and statistics can readily be appreciated without taking the required time into consideration. Consequently, for example change in which production condition or which operation condition is the cause for large variation in the statistics can readily be identified.

In addition to the above-described structure, in the quality variation display device according to the invention, a plurality of such manufacturing units are provided. The device further includes a causality information storing portion that stores causality information to specify a manufacturing unit having a causal relation with the prescribed quality, the manufacturing data adding means adds to the graph only the production condition information or the operation content information corresponding to the manufacturing unit having a causal relation with the prescribed quality based on the causality information stored by the causality information storing portion.

In this way, the manufacturing data adding means adds to the graph only the production condition information or the operation content information corresponding to the manufacturing unit having a causal relation with the prescribed quality. Therefore, irrelevant information having no causal relation with the quality is not displayed, so that the cause for variation in statistics indicated on the graph can readily be searched for.

In addition to the above described structure, the quality variation display device according to invention further includes parameter input means for accepting the number of products in each interval and the shift number of products as inputs and outputting the input number of products in the interval and the shift number of products to the graph producing means.

In this way, the user can input a desired number of products in each interval and a shift number of products to the parameter input means and look at a graph based on the input numbers.

The frequency components of the periodic variation in the quality on a product number basis can be long or short depending on various abnormality causes. When periodic variation with a long frequency component is desired to be identified, periodic variation with a short frequency component acts as a noise. In this case, the number of products in each interval and the shift number of products may be increased to remove the short frequency component, so that the periodic variation with the long frequency component can readily be identified.

When the number of products in each interval is one and the shift number of products is one, the effect of a measurement error or the like can be great. In such a case, the number of products in each interval and the shift number of products may be set larger than one, so that the effect of the measurement error or the like can be eliminated.

In addition to the above described structure, in the quality variation display device according to the invention, the statistic is at least one of the average of measurement results of products included in each interval, the median of measurement results of products included in each interval, the standard deviation or variance of measurement results of products included in each interval, and a confidence interval in measurement results of products included in each interval.

Herein, the confidence interval refers to an interval (x1, x2) where a probability function Pr(x1<x<x2) related a measurement result x equals a confidence level indicating a prescribed arbitrary probability.

In this way, the average of measurement results of products included in each interval, the median of measurement results of products included in each interval, the standard deviation or variance of measurement results of products included in each interval, or variation in a confidence interval in measurement results of products included in each interval can be identified.

In addition to the above described structure, in the quality variation display device according to the invention, the statistic includes the confidence interval, and the graph producing means produces the confidence interval by calculating prescribed transformation to the measurement results of the products so that the frequency distribution approximates a normal distribution, and calculating inverse-transformation to a transformation corresponding confidence interval for the measurement results after the transformation.

In this way, when the frequency distribution of measurement results of products is not symmetrical and does not approximate a normal distribution, the confidence interval is produced by calculating prescribed transformation to the measurement results of the products so that the frequency distribution approximates a normal distribution, and calculating inverse-transformation to a transformation corresponding confidence interval for the measurement results after the transformation. In this way, the produced confidence interval more accurately corresponds to a desired confidence level. Consequently, the calculated confidence interval and the upper and lower specification limits may be compared to accurately determine the percent defective of the products.

In addition to the above described structure, in the quality variation display device according to the invention, the quality variation graph producing means adds a line indicating at least one of the upper and lower specification limits of the prescribed quality to the quality variation graph.

In this way, the presence/absence of the occurrence of a defective product beyond the upper specification limit or below the lower specification limit can immediately be identified.

Note that a quality variation display program enables each of the aforementioned means in the quality variation display device to be carried out on a computer. Furthermore, the quality variation display program can be stored in a computer-readable storage medium, so that the quality variation display program can be carried out on an arbitrary computer.

The quality variation display device includes a quality data storing portion that stores the measuring result of each of the products measured at a measuring unit in association with the manufacturing order, graph producing means for shifting an interval (corresponding to a prescribed number of products consecutive in the manufacturing order) by a prescribed shift number of products, and obtaining a statistic for each of the intervals, thereby producing a graph in which the statistics are displayed at equal intervals in the manufacturing order, and a display portion that displays the graph produced by the graph producing means.

Therefore, by looking at the displayed graph, periodic variation in quality on a product number basis such as the occurrence of one failure for every prescribed number of products can be determined. By analyzing the displayed graph, a plurality of frequency components in the periodic variation corresponding to various abnormality causes can be identified.

BRIEF DESCRIPTION OF THE DRAWINGS

FIG. 3 is a table of an example of what is stored in a quality data storing DB in the quality variation display device;

FIG. 4 is a table of an example of what is stored in a manufacturing data storing DB in the quality variation display device;

FIG. 5 is a table of an example of time data produced by a time information adding portion in the quality variation display device;

FIG. 6A is a table of an example of what is stored in a causality/dead time information storing DB corresponding to a first measuring unit;

FIG. 6B is a table of an example of what is stored in a causality/dead time information storing DB corresponding to a second measuring unit;

FIG. 7 is a flow chart for use in illustrating the flow of processing by the quality variation display device;

DETAILED DESCRIPTION OF THE PREFERRED EMBODIMENTS

Figure 1:
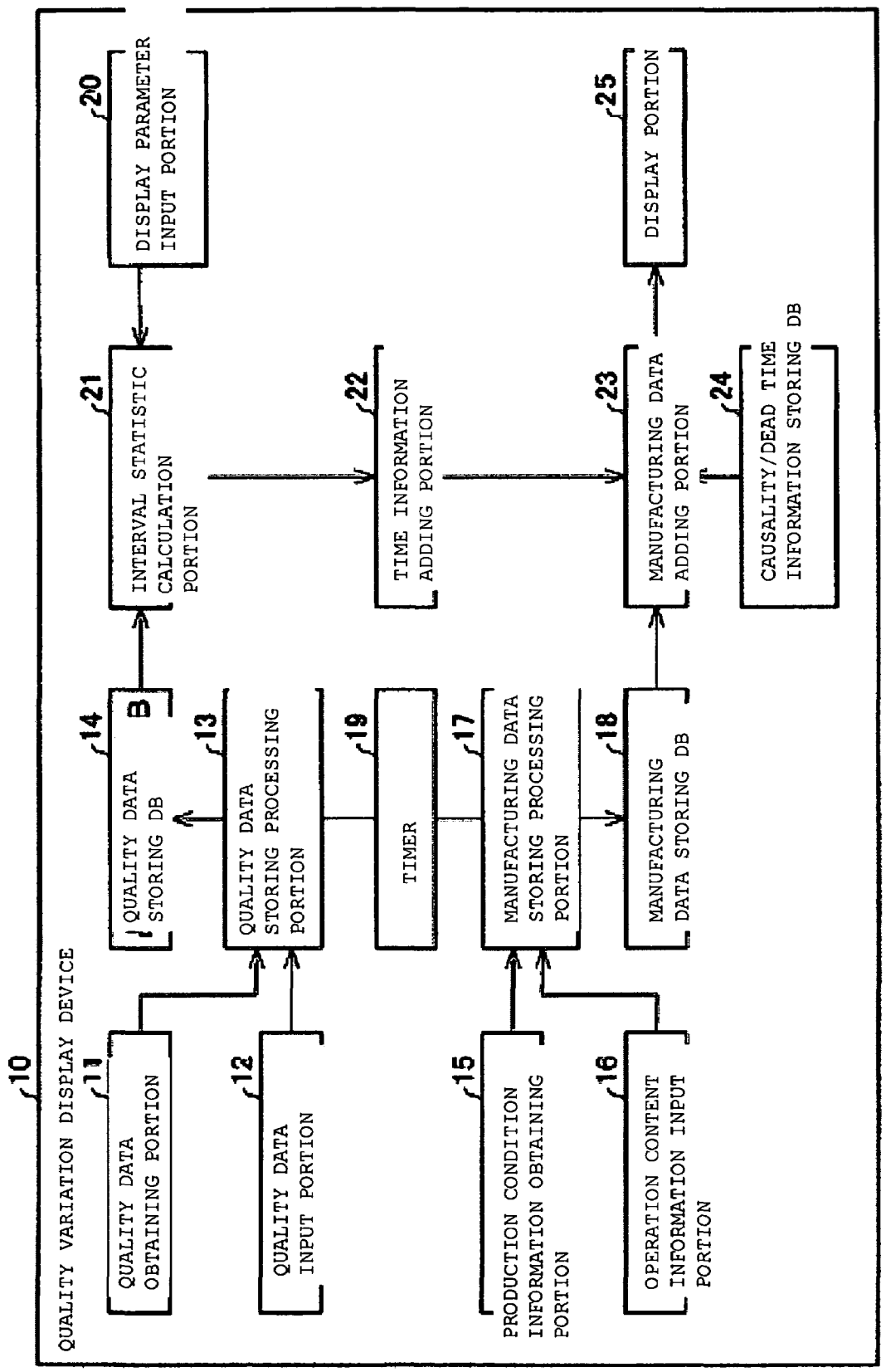
FIG. 1 is a block diagram of the configuration of a quality variation display device according to an embodiment of the invention.
Figure 2:
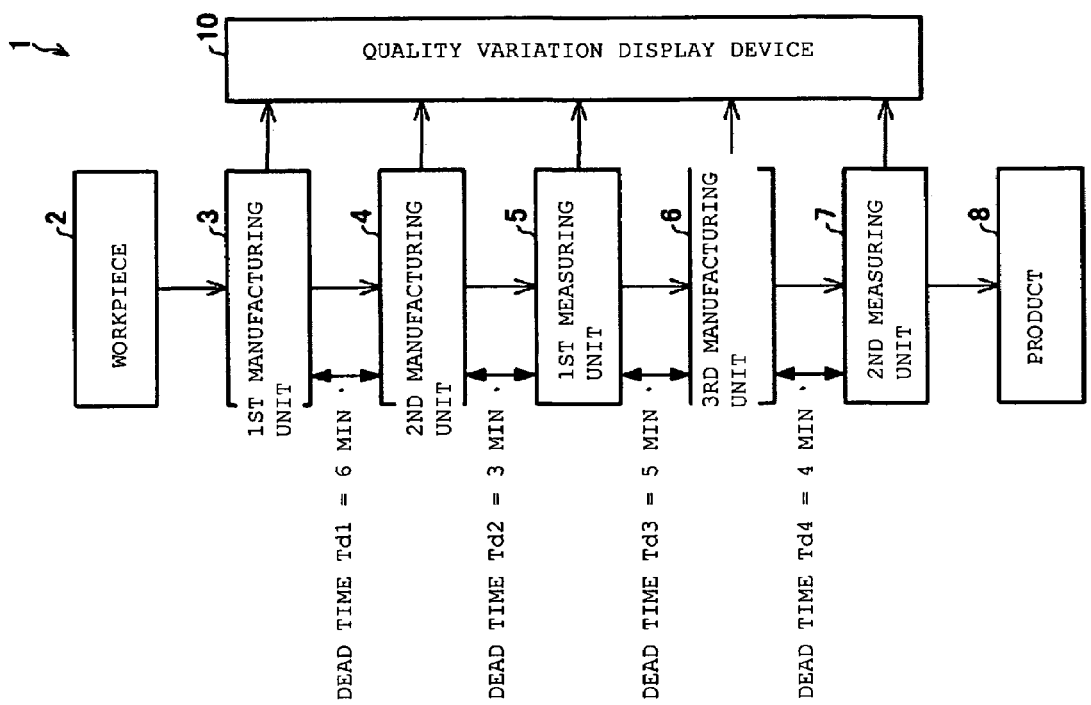
FIG. 2 is a block diagram of the general configuration of a quality display system including the quality variation display device and various other units.

One embodiment of the invention will be described in conjunction with FIGS. 1 to 9 as follows. FIG. 2 shows the general configuration of a quality display system that displays the quality of products manufactured from a material. As shown in FIG. 2, the quality display system 1 includes three manufacturing units, a first manufacturing unit 3, a second manufacturing unit 4, and a third manufacturing unit 6, a first measuring unit 5 that measures the quality characteristic of intermediate products in the process of manufacturing, a second measuring unit 7 that measures the final quality characteristic of manufactured products, and a quality variation display device 10 that collects data from each of the unit 3 to 7 and displays quality variation based on the collected data.

In general, a product 8 is manufactured by subjecting a workpiece 2 to a number of processing steps, but according to the embodiment, assume that a product is manufactured as follows for the easier understanding of the invention. The workpiece 2 is sequentially subjected to processing by the first manufacturing unit 3 and the second manufacturing 4, followed by measuring for the intermediate quality characteristic by the first measuring unit 5. Then, after processing by the third manufacturing unit 6, the second measuring unit 7 measures the quality characteristic of the product 8. The first manufacturing unit 3, the second manufacturing unit 4, the first measuring unit 5, the third manufacturing unit 6, and the second measuring unit 7 form the manufacturing line.

The manufacturing units 3, 4, and 6 carry out prescribed processing to a plurality of workpieces 2 and sequentially manufacture a plurality of products 8. The manufacturing units 3, 4, and 6 output production condition information that indicates changes in the production conditions, i.e., the conditions for the content of processing to the quality variation display device 10. The production conditions include the specification of the product, the kind of equipment such as molding dies, and the like.

Note that the specification of the product is the specification of a product 8 to be manufactured, and when the specification of the product 8 is changed, the change is input to the first manufacturing unit 3. At the time, the specification may be input to all the manufacturing units 3, 4, and 6, but it is sufficient that the specification is input only to the first manufacturing unit because the specification is common among all the manufacturing units.

The manufacturing units 3, 4, and 6 read die ID (identification) numbers attached to equipment (hereinafter "molding dies" as an example) to identify the dies. When the molding die to use is changed, the manufacturing units 3, 4, and 6 output a die ID number read from the newly mounted molding die to the quality variation display device 10. The die ID number is for example in the form of bar code provided on the die. The manufacturing units 3, 4, and 6 read the bar code and identify the die ID number corresponding to the mounted molding die.

The measuring unit 5 and 7 measure the quality characteristics of the products sequentially produced by the manufacturing units 3, 4, and 6, and output the measuring results to the quality variation display device 10. The quality characteristics of the products may be the size, electrical characteristics, weights of products and the like. The measuring units 5 and 7 may each measure a plurality of quality characteristics. For example, the measuring unit 5 may measure both the size and electrical characteristics of intermediate products.

Note that there is a time lag during the time of processing to the workpiece 2 among the units 3 to 7. More specifically, the time lag corresponds to the required time between the manufacturing time points by the manufacturing units 3, 4, and 6 and the measuring time points by the measuring units 5 and 7. The time lag (required time) will be referred to as "dead time period" in the following description. In FIG. 2, there is a dead time period Td1 (six minutes in this example) between the processing starting time by the first manufacturing unit 3 and the processing starting time by the second manufacturing unit 4. There is a dead time period Td2 (three minutes in this example) between the processing starting time by the second manufacturing unit 4 and the measuring time by the first measuring unit 5. There is a dead time period Td3 (five minutes in this example) between the measuring time by the first measuring unit 5 and the processing starting time by the third manufacturing unit 6. There is a dead time period Td4 (four minutes in this example) between the processing starting time by the third manufacturing unit 6 and the measuring time by the second measuring unit 7. These dead time periods are determined based on the conditions of how the units 3 to 7 are provided.

Now, the quality variation display device 10 will be described. As shown in FIG. 1, the quality variation display device 10 includes a quality data obtaining portion (quality data obtaining means) 11, a quality data input portion (quality data obtaining means) 12, a quality data storing processing portion 13, a quality data storing DB (quality data storing portion) 14, a production condition information obtaining portion (manufacturing data obtaining portion) 15, an operation content information input portion (manufacturing data obtaining portion) 16, a manufacturing data storing processing portion 17, a manufacturing data storing DB (manufacturing data storing portion) 18, a timer 19, a display parameter input portion 20, an interval statistic calculation portion 21, a time information adding portion 22, a manufacturing data adding portion 23, a causality/dead time information storing DB (causality information storing portion/required time storing portion) 24, and a display portion 25.

The quality data obtaining portion 11 obtains the measuring result of each product for each quality item measured in the order manufactured by the second manufacturing unit 4 from the first and second measuring units 5 and 7. Note that the quality items to obtain data for are not limited to one item from each measuring unit. Measurement values for a plurality of quality items may be obtained from one measuring unit. The quality data obtaining portion 11 for example obtains measurement values for quality items 5a, 5b, . . . from the first measuring unit 5, and measurement values for quality items 7a, 7b, . . . from the second measuring unit 7.

The quality data input portion 12 is used by the operator to input obtained measurement values. Among the quality items, the result of measurement by human eye may have higher precision for some items. One of such items is for example the presence/absence of a defect in the appearance of products. For such measurement, the first measuring unit 5 or the second measuring unit 7 has an enlarged image of products displayed for the operator to inspect and the operator determines the presence/absence of a defect in the appearance of each of the products. The quality data input portion 12 is used to input measurement results for the quality items determined by such human inspection. The quality data input portion 12 may be used by the operator to input measurement results when a communication failure is caused between the measuring units 5 and 7 and the quality variation display device 10 or when the measuring units do not have a communication function.

The quality data storing processing portion 13 stores a measuring result for each quality item in association with its measuring time. The measuring units 5 and 7 measure the quality of products in the order of manufacturing, and therefore the quality data storing processing portion 13 stores the measurement result for each quality item in association with its measuring time, so that the measuring results for the quality items are stored in the order of manufacturing.

When the quality data obtaining portion 11 obtains he measurement results for the quality items from the first and second measuring units 5 and 7, the quality data storing processing portion 13 reads their obtaining time from the timer 19, and establishes an association between the read time as the measuring time and the measurement result. The quality data storing processing portion 13 stores quality data including the measurement results for the quality items and their measuring time in association with one another in a quality data storing DB 14.

Similarly, when the measurement results for the quality items are input to the quality data input portion 12, the quality data storing processing portion 13 reads the input time from the timer 19, and establishes an association between the read time as the measuring time and the measurement results. The quality data storing processing portion 13 stores the quality data including the measurement results and their measuring time in association with one another in the quality data storing DB 14.

Note that the quality data storing processing portion 13 stores quality data corresponding to measurement results related to the first measuring unit 5 and quality data corresponding to measurement results related to the second measuring unit 7 in separate tables in the quality data storing DB 14.

The quality data storing DB (database) 14 stores measurement results for the quality items of products measured by the measuring units 5 and 7 in association with the order of manufacturing. More specifically, the quality data storing DB (database) 14 stores quality data including the quality data storing portion and the measurement results for the quality items, and the time when the measurement results are obtained (corresponding to the measuring time) or the time when the measuring results are input (corresponding to the measuring time) in association with one other for each of the quality items.

FIG. 3 is a table of an example of quality data related to the first measuring unit 5 stored in the quality data storing DB 14. As shown in FIG. 3, the quality data storing DB 14 stores the measuring results and the measuring time in association with each other for each of the quality items 5*a*, 5*b*, . . . measured by the first measuring unit 5.

When any of various production conditions is changed in each of the manufacturing units 3, 4, and 6, the production condition information obtaining portion 15 obtains production condition information indicating the occurrence of the change and a newly set production condition. For example, when a molding die to be used in any of the manufacturing units 3, 4, and 6 is changed, the production condition obtaining portion 15 obtains information on the occurrence of the change, and a die ID number corresponding to the newly mounted molding die from the manufacturing unit 3, 4 and 6.

Operation content information related to an operation content in each of the manufacturing units is input to the operation content information input portion 16. The operation content refers to for example repair after the occurrence of some failure in a manufacturing unit, dust cleaning of tool included in a manufacturing unit, or positional adjustment of a jig. These kinds of content information are input by the operator to the operation content input portion 16 at the end of operation.

The manufacturing data storing processing portion 17 stores manufacturing data including the production condition information and operation content information described above and change in any of the production conditions and the occurrence time of the operation in association with one another.

When the production condition information obtaining portion 15 obtains production condition information from any of the manufacturing units 3, 4, and 6, the manufacturing data storing processing portion 17 reads the time of obtaining the information from the timer 19, and stores the manufacturing data including the read time as the occurrence time of the production condition change in association with the production condition information in a manufacturing data storing DB 18.

Similarly, when operation content information is input to the operation content information input portion 16, the manufacturing data storing processing portion 17 reads the time of input from the timer 19, and stores manufacturing data including the read time as the occurrence time of operation in association with the operation content information in the manufacturing data storing DB 18.

The manufacturing data storing DB 18 stores manufacturing data including production condition information that indicates change in the production conditions in any of the manufacturing units 3, 4, and 6 and the occurrence time of the change in the production condition in association with each other or manufacturing data including operation content information indicating the content of operation in the manufacturing unit and the occurrence time of the operation in association with each other for each of the manufacturing units 3, 4, and 6.

FIG. 4 is a table of an example of manufacturing data related to the first manufacturing unit 3 stored in the manufacturing data storing DB 18. As shown in. FIG. 4, the manufacturing data storing DB 18 stores the change of a molding die to "#3" at time 09: 36: 08 as production condition information. The manufacturing data storing DB 18 also stores the positional adjustment of a jig at time 10: 04: 56 and dust cleaning of tool at time 13: 11: 32 as operation content information.

Various parameters regarding quality data to be displayed by the display portion 25 are input to the display parameter input portion 20.

The parameters regarding the quality data include for example the kind of quality item, a display range (including both the display range of a designated period such as the recent eight hours and the display range of a specified number of products such as newly produced 10000 products), the number of products in each interval (hereinafter as "interval width") and a shift number of products (hereinafter as "shift number") in each interval in a quality variation graph to be displayed, the kind of statistic to be displayed in each interval, and the upper and lower specification limits that define the range of a conforming product.

Note that the statistic refers to for example the average of the measurement results for products included in each interval, the median of the measurement results of products included in each interval, the standard deviation σ or variance of the measurement results of products included in each interval or 6×σ, a confidence interval in the measurement results of products included in each interval (such as average ±3×standard deviation).

Herein, the confidence interval is an interval (x1, x2) when a probability function Pr(x1<x<x2) related to quality data x equals a confidence level 1-α represented by a predetermined given probability. The probability function Pr(x1<x<x2) indicates the probability that the quality data x falls within the range from x1 to x2 in the frequency distribution of the quality data x.

It is known that when for example the confidence level 1-α is 99.74%, and the quality data x follows a normal distribution, the confidence interval equals (average −3×standard deviation, average +3×standard deviation).

Note that according to the embodiment, the interval statistic calculation portion 21 calculates a confidence interval (average −3×standard deviation, average +3×standard deviation) with a confidence level of 99.74% provided that the frequency distribution of the quality data approximates a normal distribution.

The interval statistic calculation portion 21 obtains a statistic for each interval while it shifts an interval corresponding to a predetermined number of products by a prescribed shift number depending on a parameter input to the display parameter input portion 20, and produces a quality variation graph indicating the statistics at equal intervals in the order of manufacturing.

The interval statistic calculation portion 21 includes statistic calculation means (not shown) for shifting an interval corresponding a prescribed number of products by a prescribed shift number depending on a parameter input to the display parameter input portion 20, thereby calculating a statistic for each interval and statistic plotting means (not shown) for producing a graph having the statistics plotted at equal intervals in the order of manufacturing.

More specifically, the interval statistic calculating means 21 reads out quality data corresponding to the kind of a quality item input to the display parameter input portion 20 from the quality data storing DB 14.

The interval statistic calculation portion 21 allocates the quality data included in the display range input to the display parameter input portion 20 to a plurality of intervals according to an interval width and a shift number input to the display parameter portion 20. As a result, the intervals have the interval widths consecutive in the order of manufacturing and are shifted by the shift number. The interval statistic calculation portion 21 further calculates statistics of the measurement results of quality data included in each of the intervals depending on the kind of the statistics input to the display parameter input portion 20.

The interval statistic calculation portion 21 produces a quality variation graph by plotting the statistics calculated for the intervals in the order of measuring time (in other words in the order of manufacturing) at equal intervals. More specifically, a statistic in each interval is plotted on a product number-based axis (hereinafter as "number based axis") where the shift number is a unit.

At the time, the interval statistic calculation portion 21 adds lines indicating the upper and lower specification limits input to the display parameter input portion 20 to the quality variation graph.

The interval statistic calculation portion 21 outputs the thus produced quality variation graph and the measuring time corresponding to the central product in each interval (product measured in the middle of the interval) to the time information adding portion 22.

When the products corresponding to the display range are products No. 1 to No. 10000, the interval width covers 50 products, and the shift number is 25, the interval statistic calculation portion 21 determines that products No. 1 to No. 50, No. 26 to No. 75, No. 51 to No. 100, . . . , No. 9551 to No. 10000 are the products to be included in the intervals to be displayed.

When the statistic input to the display parameter input portion 20 is an average, the interval statistic calculation portion 21 calculates the average of measuring results of the products included in each interval (for example products No. 1 to No. 50 in the first interval).

The interval statistic calculation portion 21 outputs the thus produced quality variation graph and measuring time corresponding to the central product in each interval (for example No. 25 in the first interval) to the time information adding portion 22.

The time information adding portion 22 adds the measuring time axis to the quality variation graph produced by the interval statistic calculation portion 21. In this way, the relation between each statistic and measuring time can be determined.

Herein, the scale intervals on measuring time axis are preferably isochronal. In this way, the elapse of measuring time can easily be recognized.

The time information adding portion 22 previously stores an association table between a predetermined reference range and the scale intervals on the measuring time axis. The time information adding portion 22 compares the reference range to the display range of the quality variation graph produced by the interval statistic calculation portion 21, and determines the scale intervals on the measuring time axis to be added. For example, the time information adding portion 22 previously stores the reference range T1 (one hour) or less and a scale interval of five minutes, the reference range from T1 to T2 (three hours) and a scale interval of 20 minutes, the reference range from T2 to T3 (ten hours) and a scale interval of one hour, . . . , and on. If for example the time corresponding to the display range of the quality variation graph produced by the interval statistic calculation portion 21 is eight hours, the time information adding portion 22 determines that the scale interval on the measuring time axis is one hour.

The time information adding portion 22 calculates the positional coordinates on the number-based axis of the quality variation graph that correspond to time by the determined scale marked on the measuring time axis. More specifically, the time information adding portion 22 obtains an approximation expression indicating the association between positional coordinates and measuring time on the number-based axis based on the measuring time of the central product in each interval output from the interval statistic calculation portion 21. The time information adding portion 22 then calculates the positional coordinates on the number-based axis corresponding to time on the scale of the measuring time axis. The time information adding portion 22 then produces time data including the time on the scale of the measuring time axis and the positional coordinates on the number-based axis in association with each other.

FIG. 5 is a table of an example of the time data produced by the time information adding portion 22. As shown in FIG. 5, the time information adding portion 22 produces the time data indicating that the positional coordinate on the number-based axis for the first measuring unit 5 is 9.8 corresponding to time 9: 00: 00 on the scale of the measuring time axis.

In addition, the time information adding portion 22 produces a measuring time axis having a scale at intervals of prescribed time based on the produced time data and the approximation expression representing the relation between the positional coordinates on the number-based axis and the measuring time, and outputs a quality variation graph having the produced measuring time axis to the manufacturing data adding portion 23.

A causality/dead time information storing DB 24 stores the presence/absence of any causal relation between each of the manufacturing units 3, 4, and 6 and each of the quality items, and if there is any such causal relation, the DB stores dead time indicating the time lag between the processing starting time by the manufacturing unit and the measuring time of the quality data. Note that when any processing in the manufacturing units 3, 4, and 6 affects quality data in any way, there is a causal relation, and otherwise there is no such causal relation. The presence/absence of such a causal relation is predetermined based on the content of processing by the manufacturing units 3, 4, and 6 and the measuring items. The dead time is also predetermined when the manufacturing line is designed.

FIGS. 6A and 6B are tables each giving an example of what is stored in the causality/dead time information DB 24. In FIGS. 6A and 6B, "−1" represents the absence of a causal relation, and the numbers other than "−1" represent the presence of a causal relation and dead time. As shown in FIGS. 6A and 6B, the causality/dead time information storing DB 24 stores the absence of a causal relation between the first and third manufacturing units 3 and 6 and the measuring item 5a in the first measuring unit 5, the presence of a causal relation with the second manufacturing unit 4 having "three minutes" as dead time. The causality/dead time information storing DB 24 stores causality/dead time related to the measuring units 5 and 7 in separate tables as shown in FIGS. 6A and 6B. In this way, the causality/dead time regarding the measuring units 5 and 7 can readily be read out.

The manufacturing data adding portion 23 adds manufacturing data to a quality variation graph output from the time information adding portion 22 based on information stored by the causality/dead time information DB 24.

The manufacturing data adding portion 23 reads out a manufacturing unit having a causal relation with a quality item in the quality variation graph and dead time by the manufacturing unit from causality/dead time information DB 24. The manufacturing data adding portion 23 reads out manufacturing data corresponding to the read out manufacturing unit from the manufacturing data storing DB 18 and adds the manufacturing data to the quality variation graph. At the time, the manufacturing data adding portion 23 produces a manufacturing time axis having its scale adjusted by reducing the dead time read out from the causality/dead time information DB 24 from the scale on the measuring time axis and adds the thus produced manufacturing time axis to the quality variation graph.

Then, the manufacturing data adding portion 23 adds production condition information and operation content information on the axis having the manufacturing time axis corresponding to the occurrence time included in the manufacturing data. The manufacturing data adding portion 23 then makes the display portion 25 display the quality variation graph having the measuring time axis, the manufacturing time axis, the production condition information and the operation content information.

In this way, the operation content information and/or the production condition information and the measuring results for the quality items can be associated with one another without taking the dead time into consideration.

Note that the manufacturing data adding portion 23 may read out only the part of the manufacturing data corresponding to the first manufacturing unit 3 related to change in the specification of the product regardless of the presence/absence of causality and add the change information about the product specification to the quality variation graph as well as the manufacturing data corresponding to the name of the manufacturing unit having a causal relation. In this way, the time point of changing the product specification can be identified.

The display portion 25 displays quality data and is made of a liquid crystal panel.

Figure 8:
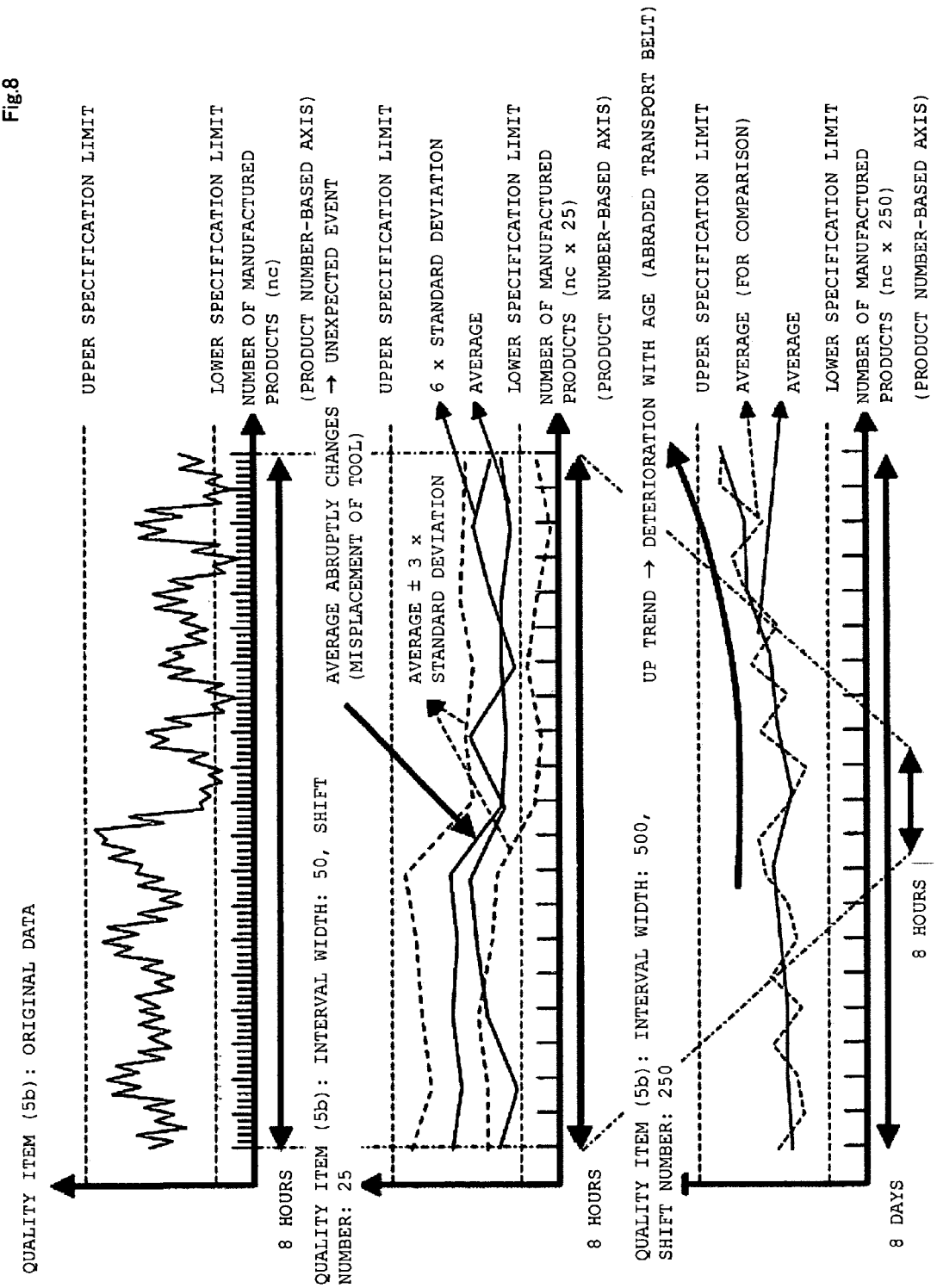
FIGS. 8 and 9 show examples of quality variation graphs displayed by the quality variation display device.
Figure 9:
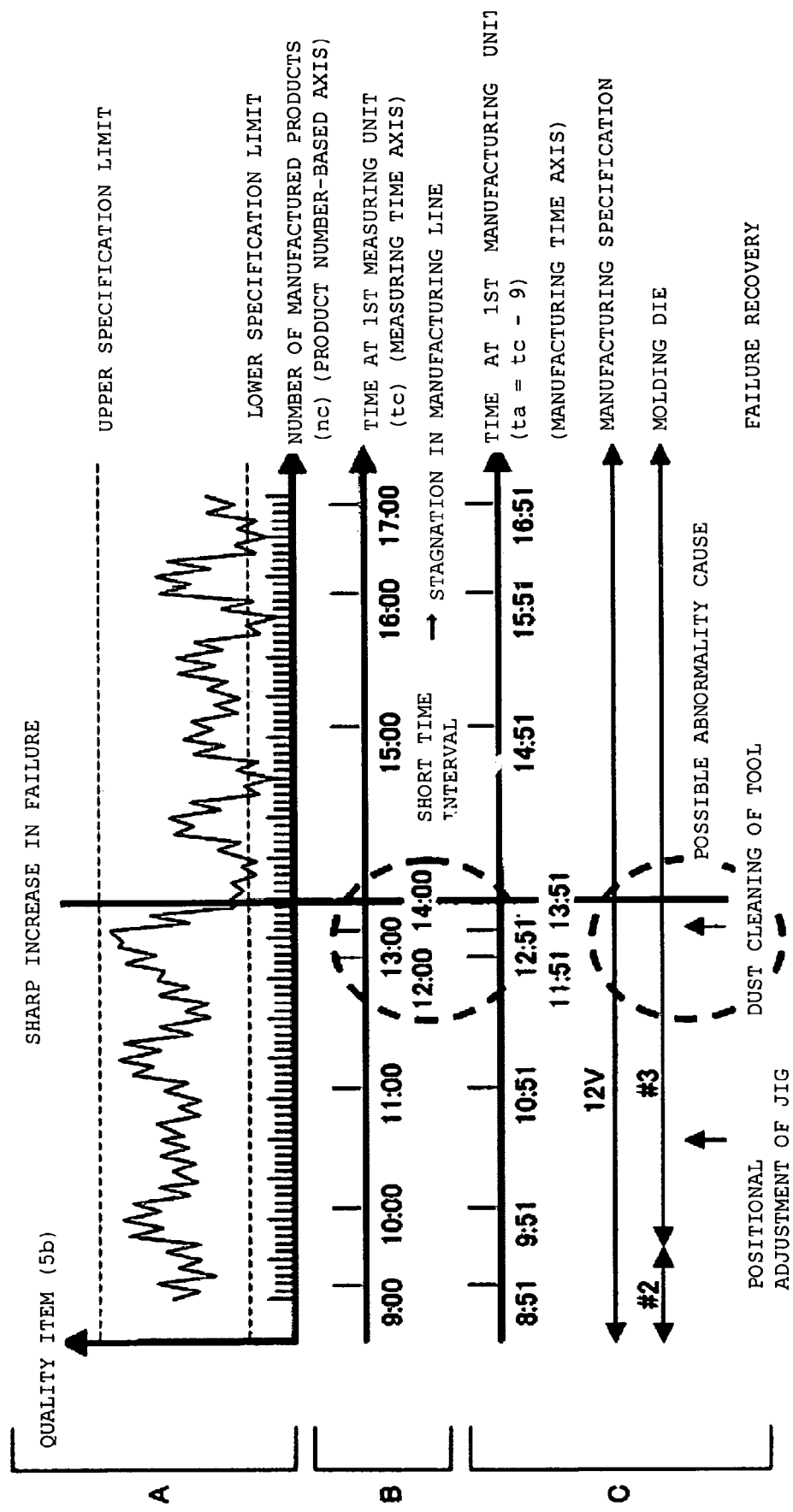

Now, the flow of processing in the quality variation display device 10 and an example of display will be described. FIG. 7 is a flow chart for use in illustrating the flow of the processing by the quality variation display device 10. FIGS. 8 and 9 show examples of contents displayed at the display portion 25.

The quality data obtaining portion 11 obtains a measuring result for each of the quality items from the first and second measuring units 5 and 7. Alternatively, the operator inputs a measuring result of an intermediate product to the quality data input portion 12. Assume now that the quality data obtaining portion 11 obtains a measuring result in this example. The quality data storing processing portion 13 reads time when the quality data obtaining portion 11 obtains the measuring result as the measuring time from the timer 19, and produces quality data having the read measuring time and the measuring result in association with each other. Then, the quality data storing processing portion 13 stores the thus produced quality data in the quality data storing DB 14 (S1).

Then, the display parameter input portion 20 accepts various input parameters related the quality data to be displayed (S2).

The interval statistic calculation portion 21 reads out quality data corresponding to the kind of a quality item input to the display parameter input portion 20 from the quality data storing DB 14.

The interval statistic calculation portion 21 allocates the quality data included in the display range input to the display parameter input portion 20 to a plurality of intervals according to an interval width and a shift number input to the display parameter portion 20. As a result, the intervals have the interval widths consecutive in the order of manufacturing and are shifted by the shift number.

The interval statistic calculation portion 21 calculates the statistic of a measuring result of quality data included in each interval depending on the kind of statistic input to the display parameter input portion 20. The interval statistic calculation portion 21 produces a quality variation graph having the statistics calculated for the intervals plotted at equal intervals in the order of measuring time (in other words, in the order of manufacturing)(S3). In short, the statistic for each interval is plotted on the number-based axis where the shift number is one unit.

At the time, the interval statistic calculation portion 21 adds the upper and lower specification limits input to the display parameter input portion 20 to the quality variation graph. In this way, an up/down trend in the number of defective products can easily be determined.

The interval statistic calculation portion 21 outputs the thus produced quality variation graph and the measuring time of the central product in each of the intervals on the number-based axis in the quality variation graph to the time information adding portion 22.

FIG. 8 shows examples of the quality variation graph produced by the interval statistic calculation portion 21.

The upper graph in FIG. 8 is an example of a quality variation graph produced by the interval statistic calculation portion 21 when a quality item 5b, a display range of eight hours, an interval width of one, a shift number of one, and an average as the kind of statistic are input to the display parameter input portion 20. As shown in the upper graph in FIG. 8, the interval statistic calculation portion 21 produces a number-based axis where a shift number of one is the interval, and the measurement result of each product for the quality item 5b (corresponding to the average in the interval because one product is included in the interval width) is directly plotted on the number-based axis. As a result, the quality variation graph produced by the interval statistic calculation portion 21 plots the measuring result of each product at equal intervals of a prescribed number of products (that is one in this example), so that periodic variation on a product number basis such as the occurrence of quality variation in the ratio of one for every three products can immediately be identified.

Note that in the upper graph in FIG. 8, the shown scale interval is marked by a scale dividing the interval into five, but the scale is not shown for the purpose of simplification.

Meanwhile, the middle graph in FIG. 8 shows an example of a quality variation graph produced by the interval statistic calculation portion 21 when a quality item 5$b$, a display range of eight hours, an interval width of 50, a shift number of 25, and an average/a confidence interval (average +3×standard deviation in this example)/6×standard deviation as the kind of statistic are input to the display parameter input portion 20.

As shown, the interval statistic calculation portion 21 produces a number-based axis according to the parameters input to the display parameter input portion 20 where the interval width is 50 and the shift number is 25. When products No. 1 to No. 550 correspond to the display range (eight hours in this example) input to the display parameter input portion 20, the interval statistic calculation portion 21 determines products No. 1 to No. 50, No. 26 to No. 75, No. 51 to No. 100, . . . , No. 501 to No. 550 as the products included in the allocated intervals. The interval statistic calculation portion 21 plots the average/the confidence interval (average ±3×standard deviation in this example)/6× standard deviation calculated from the measurement results for quality item 5$b$ in the first interval (products No. 1 to No. 50), the second interval (products No. 26 to No. 75), . . . , and on at equal intervals in the manufacturing order (i.e., in the order of the first interval, the second interval, and on).

In this way, the average/confidence interval (average ±3×standard deviation in this example)/6×standard deviation produced from the products included in each of the intervals is plotted at equal intervals of a prescribed number of products (25 in this example). Consequently, using the quality variation graph, periodic variation on a product number basis can be identified similarly to the case of the upper graph in FIG. 8.

In the quality variation graph in the middle of FIG. 8, the number of products in each interval and the shift number are larger than those in the upper graph in FIG. 8, and therefore components based on noise fluctuations caused by measuring errors, short periodic variation on a product number basis and the like can be removed. As a result, the presence/absence of quality variation caused by unexpected events in particular (such as misplacement of a tool while dust cleaning of tool) can easily be identified. The confidence interval of average ±3×standard deviation is included in the quality variation graph provided that the quality data approximates a normal distribution, so that increase/decrease in the percent defective can be determined.

The lower graph in FIG. 8 is an example of a graph produced by the interval statistic calculation portion 21 when a quality item 5$b$, a display range of eight days, an interval width of 500, a shift number of 250, and an average as the kind of statistic are input to the display parameter input portion 20.

In FIG. 8, the "average" (solid line in FIG. 8) refers to the average in each interval when the interval width is 500 and the shift number is 250. The term "average (for comparison)" (dotted line in FIG. 8) refers to the average in each interval when the interval width is 50 and the shift number is 25 (i.e., the average in the middle graph in FIG. 8), and is added for the purpose of comparison to clearly demonstrate the effect of the bent line denoted by the "average."

As shown, the interval width and the shift number are increased, so that the long term trend of the quality variation can easily be identified. In this way, the relation between a long tern unit variation such as abrasion of a transfer belt in each of the manufacturing units 3, 4, and 6 and quality variation can easily be appreciated.

Note that in order to identify quality variation caused by an unexpected event such as exchange of a transfer belt, a quality variation graph preferably has a number-based axis with a relatively short interval width and a shift number as shown in the middle graph in FIG. 8.

When an expendable part such as a transfer belt is exchanged, quality variation before the exchange is preferably displayed in the form of a quality variation graph having a number-based axis with a large interval width and a large shift number as shown in the lower graph in FIG. 8. In this way, quality variation according to the wear-out degree of expendable supplies can be identified.

Now, the time information adding portion 22 adds a measuring time axis as time information to the quality variation graph produced by the interval statistic calculation portion 21 (S4). More specifically, the time information adding portion 22 determines a scale interval on a measuring time axis to be added based on the display range and the predetermined reference range in the graph produced by the interval statistic calculation portion 21. For example, when the display range of the graph produced by the interval statistic calculation portion 21 corresponds to eight hours, the time information adding portion 22 determines the scale interval on the measuring time axis to one hour.

The time information adding portion 22 produces an approximation expression representing the association between the positional coordinates and the measuring time on the number-based axis based on the measuring time of the central product in each interval output from the interval statistic calculation portion 21, and calculates positional coordinates on the number-based axis corresponding to the time on the scale marked on the measuring time axis. The time information adding portion 22 produces time data including the time on the scale interval on the determined measuring time axis and the positional coordinates on the number-based axis in association with each other.

The time information adding portion 22 produces a measuring time axis having a scale marked at intervals of prescribed time based on the produced time data and the approximation expression representing the positional coordinates on the axis having the number based scale and the measuring time. The time information adding portion 22 adds the thus produced measuring time axis to the quality variation graph produced by the interval statistic calculation portion 21.

FIG. 9 at part B shows an example of the measuring time axis added by the time information adding portion 22. As shown, the scale intervals on the measuring time axis added by the time information adding portion 22 are not equal. For example, the length of the scale interval between time 10: 00 and time 11: 00 is longer than the length between time 12: 00 and time 13: 00. The size of the scale interval length on the measuring time axis represents the presence/absence of stagnation in the manufacturing line.

More specifically, when the scale interval length on the measuring time axis is small, the number of products measured per unit time is large. This indicates that there is stagnation in the manufacturing line. Meanwhile, when the scale interval length on the measuring time axis is large, the number of products measured per unit time is large. This indicates that the manufacturing line flows smoothly. In this way, using the size of the scale interval length on the measuring time axis, the presence/absence of stagnation in the manufacturing line can easily be identified.

The processing in S5 is carried out in parallel with the processing in S1 to S4. More specifically, the production condition information obtaining portion 15 obtains production condition information related to changes in the product specification or molding die from the first, second, and third manufacturing units 3, 4, and 6. The operator inputs operation content information in any of the manufacturing units 3, 4, and 6 to the operation content information input portion 16.

The manufacturing data storing processing portion 17 reads time when the production condition information obtaining portion 15 has obtained the production condition information from the timer 19 and produces manufacturing data having the read time and the production condition information in association with each other. Similarly, the manufacturing data storing processing portion 17 reads time when the operation content information has been input to the operation content information input portion 16 from the timer 19, and produces manufacturing data having the read time and the operation content information in association with each other. The manufacturing data storing processing portion 17 stores the produced manufacturing data in the manufacturing data storing DB 18.

Then, the manufacturing data adding portion 23 carries out the processing of adding the manufacturing data to the quality variation graph provided with the measuring time axis (S6). More specifically, the manufacturing data adding portion 23 reads out the name of a manufacturing unit having a causal relation with a quality item and dead time displayed at the quality variation graph from the causality/dead time information storing DB 24. For example, the manufacturing data adding portion 23 reads "first manufacturing unit 5" as the name of the manufacturing unit having a causal relation with the quality item 5b and nine minutes as the dead time by the first manufacturing unit 5 from the causality/dead time information storing DB 24 as shown in FIG. 6A.

The manufacturing data adding portion 23 then reads out the manufacturing data of the manufacturing unit corresponding to the read out manufacturing unit name from the manufacturing data storing DB 18. For example, the manufacturing data adding portion 23 reads out the manufacturing data as shown in FIG. 4 as the manufacturing data corresponding to the "first manufacturing unit 5" as the read out manufacturing unit name.

The manufacturing data adding portion 23 produces a manufacturing time axis having a scale produced by reducing the dead time read out from the causality/dead time information storing DB 24 from the scale on the measuring time axis and adds the thus produced manufacturing time axis to the quality variation graph.

The manufacturing data adding portion 23 adds the manufacturing data read out from the manufacturing data storing DB 18 on the manufacturing time axis. For example, when the manufacturing data as shown in FIG. 4 is read out, the manufacturing data adding portion 23 adds the change of the molding die to "#3" at the occurrence time 09: 36: 08, "positional adjustment of a jig" at the occurrence time 10: 04; 56, and "dust cleaning of tool" at the occurrence time 13: 11: 32 on the manufacturing time axis.

The manufacturing data adding portion 23 has the quality variation graph having the added information including the measuring time axis, the manufacturing time axis, the production condition information, and the operation content information displayed at the display portion 25.

FIG. 9 at part C shows an example of the measuring time axis, the manufacturing time axis, the production condition information and the operation content information added by the manufacturing data adding portion 23. As shown, the manufacturing data adding portion 23 produces a manufacturing time axis having a scale produced by reducing nine minutes as the dead time from the scale of the measuring time axis, and adds the production condition information and the operation content information included in the manufacturing data as shown in FIG. 6A on the manufacturing time axis.

Note that based on the production condition information indicating change in the molding die or the product specification, it can be recognized that the same molding die or manufacturing specification continues to be applied during the intervals before the next change. Therefore, as shown, the manufacturing data adding portion 23 carries out interval display according to which separate intervals are set between before and after the point of change regarding the product specification or the molding die as the production condition information. In this way, which production condition is applied in which interval can readily be appreciated.

As shown, the manufacturing data adding portion 23 has operation content information (that occurs mainly unexpectedly) represented by characters indicating the operation content information and an arrow indicating the point of the occurrence of the operation content. In this way, which operation content occurs in which point can readily be appreciated.

Furthermore, as shown in FIG. 9 at part C, production condition information and operation content information are displayed on the manufacturing time axis having a scale produced by reducing nine minutes as dead time from the scale on the measuring time axis, so that the relation between the production condition information and/or the operation content information and quality variation can immediately be appreciated. Consequently, it can readily be found out that change in which production condition or operation content has caused the quality variation. For example in FIG. 9, the operation content "dust cleaning of tool" can be determined as a highly possible candidate for the cause of increased failures.

The manufacturing data adding portion 23 adds only the manufacturing data related to the manufacturing units 3, 4, and 6 having a causal relation with the quality items in the quality variation graph to be displayed. Therefore, irrelevant information having no causal relation with the quality variation is not displayed, so that the cause for the quality variation can readily be searched for.

The invention is not limited to the above described embodiment but may be modified in various manners within the scope of claims. More specifically, embodiments implemented by combining technical means modified as desired within the scope of the claims are also included in the technical scope of the invention.

For example, according to the embodiment, the three manufacturing units 3, 4, and 6 and the two measuring units 5 and 7 are used, but the number may be one or more for each kind of the units.

The manufacturing data adding portion 23 adds the manufacturing time axis. However, the manufacturing data adding portion 23 may add dead time to the occurrence time of the manufacturing data to adjust the occurrence time rather than adding the manufacturing time axis. Then, the manufacturing data adding portion 23 may add production condition information or operation content information in the position of coordinates on the measuring time axis corresponding to the adjusted occurrence time. More specifically, the manufacturing data adding portion 23 adjusts the occurrence time of the manufacturing data based on the dead time stored by the causality/dead time information storing DB 24, and may add the production condition information or operation content information corresponding to the occurrence time to the graph based on the adjusted occurrence time and the measuring time base. In this way, with reference to the quality variation graph, the relation between the production condition information or operation content information and the quality variation can be identified without taking the dead time into consideration.

According to the embodiment, the quality data storing processing portion 13 and the manufacturing data storing processing portion 17 set measuring time, change in the production condition, and the occurrence time of operation using the same timer 19. In this way, the association between measuring time included in quality data and occurrence time included in manufacturing data can be accurate. Meanwhile, the timer 19 may be provided outside the quality variation display device 10, so that the measuring units 5 and 7 may read the measuring time of each product from the timer 19 and output the measuring result and the measuring time to the quality variation display device 10. Similarly, the manufacturing units 3, 4, and 6 may read the occurrence time of any change in the production condition from the timer 19 and output the production condition information and the occurrence time to the quality variation display device 10.

According to the embodiment, the time information adding portion 22 obtains an approximation expression representing the association between positional coordinates on the number-based axis and measuring time based on the measuring time of the central product in each of the intervals. Meanwhile, the time information adding portion 22 may obtain the approximation expression based on the average of the measuring time (average measuring time) of the first product in each of the intervals or the products included in each of the intervals. It is sufficient that the measuring time representing each of the intervals is calculated according to the same standard among the intervals.

Note that the average of the measuring time of the products included in each of the intervals can be calculated by the interval statistic calculation portion 21.

Note that in the above-described example according to the embodiment, the interval statistic calculation portion 21 calculates a confidence interval (average −3×standard deviation, average +3×standard deviation) corresponding to a confidence level of 99.74% provided that the frequency distribution of quality data approximates a normal distribution.

However, the confidence level may be a predetermined arbitrary value such as 99.5%.

When the frequency distribution of the quality data x does not approximate a normal distribution, a confidence interval produced from the average $x_{ave}$ and standard deviation $x_\sigma$ of the quality data x (such as a confidence interval ($x_{ave}-3\times x_\sigma$, $x_{ave}+3\times x_\sigma$) for a confidence level of 99.74%) does not correspond to a desired confidence level (such as 99.74%). Now, this will be detailed with reference to FIG. 10.

Figure 10:
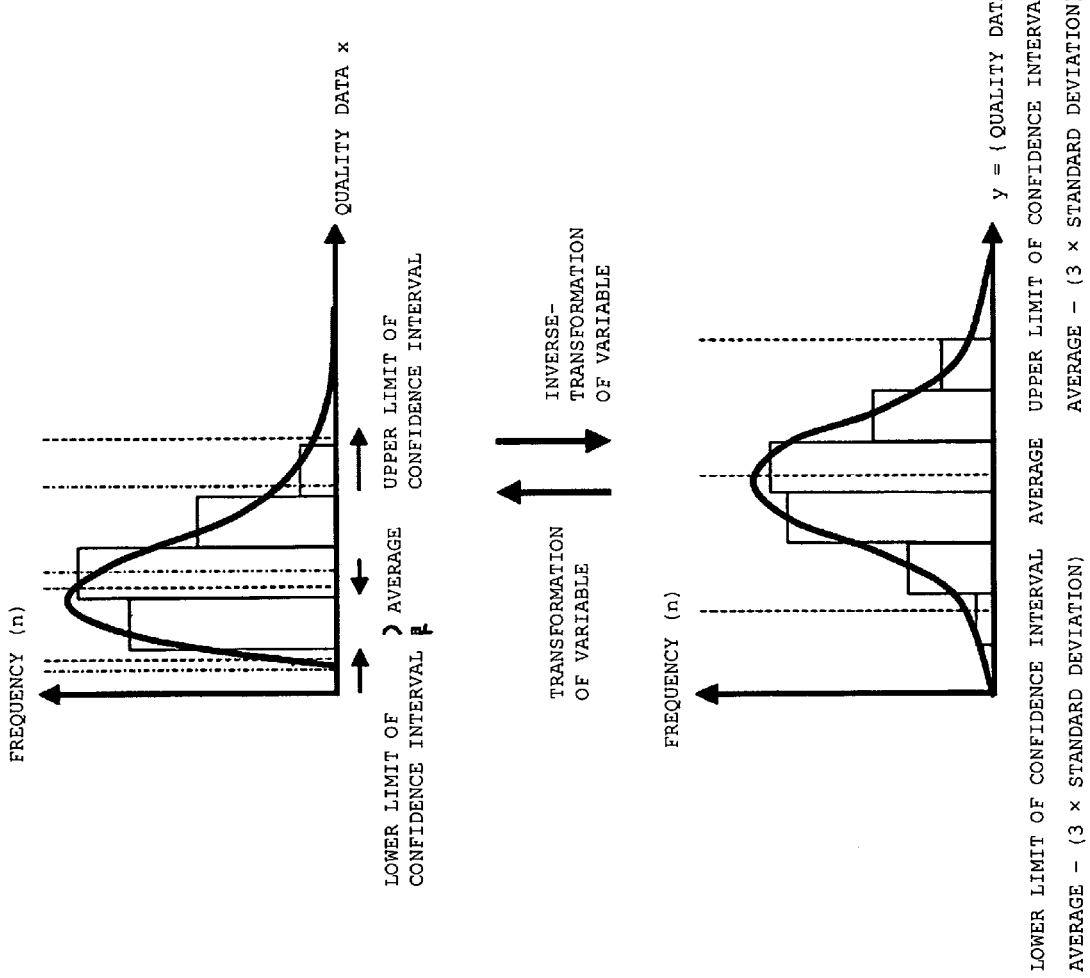
FIG. 10 shows graphs for use in illustrating a method of calculating a confidence interval when the frequency distribution of quality data does not approximate a normal distribution.

The upper part in FIG. 10 represents the frequency distribution of the quality data x of 50 of these products. As shown, the frequency distribution of the quality data x has a long tail in the direction in which the value x increases and does not approximate a normal distribution. In this case, a confidence interval calculated by the interval statistic calculation portion 21 based on the average $x_{ave}$ and the standard deviation $x_\sigma$ of the quality data x does not correspond to a desired confidence level.

Assume for example that as a confidence interval corresponding to a confidence level of 99.74%, ($x_{ave}-3\times x_\sigma$, $x_{ave}+3\times x_\sigma$) is produced. Note that in the upper part in FIG. 10, $x_{ave}$ and $x_{ave}\pm3\times x_\sigma$ are denoted by chain dotted lines. As shown in the upper part in FIG. 10, the frequency distribution of the quality data x has a long tail on the right and, as can be seen, $x_{ave}$ is shifted to the right from the peak position. The number of products having a greater value than $x_{ave}+3\times x_\sigma$ is large, and the confidence interval ($x_{ave}-3\times x_\sigma$, $x_{ave}+3\times x_\sigma$) does not correspond to the desired confidence level of 99.74%.

This is because the quality data x does not approximate a normal distribution. The confidence interval (average −3×standard deviation, average +3×standard deviation) corresponds to 99.74% only if the frequency distribution approximates a normal distribution.

Therefore, when the interval statistic calculation portion 21 calculates (average −3×standard deviation, average +3×standard deviation) as a confidence interval for a confidence level of 99.74 uniformly for all the quality data pieces, a confidence interval greatly shifted from the intended interval can be displayed for any quality data piece not approximating a normal distribution. Therefore, the manufacturing manager can make a wrong judgement that the confidence interval is closer to the lower specification limit and there is still allowance to the upper specification limit.

Therefore, it is preferable that the interval statistic calculation portion 21 carries out transformation (transformation of variable) to the quality data so that the data approximates a normal distribution, then calculates an average and each statistic for the transformed quality data, and then inverse-transformation is carried out to the calculated average and statistics. In this way, the average and the statistics for the quality data are produced.

Now, power transformation will be described as an example of the transformation of variable. The power transformation is used for the purpose of transforming a non-symmetrical, deformed frequency distribution into a symmetrical frequency distribution.

Now, the process of producing an average and various statistics by the power transformation in the interval statistic calculation portion 21 will be described.

Note that the quality variation display device 10 includes a transforming method storing portion that stores the value of the exponent part in predetermined power transformation based on the trend of the distribution and property of the quality data. The transformation method storing portion stores the items of quality data and the values of the exponent part suitable for the quality data in association with one another. In this example, the transformation method storing portion stores "½" as the value of the exponent part for the quality data x. This means that variable $y=f(x)=x^{1/2}$ after the power transformation approximates a normal distribution.

The interval statistic calculation portion 21 carries out power transformation to the quality data x that does not approximate a normal distribution according to the value of the exponent part (½ in this example) read out from the transformation method storing portion, and the frequency distribution of variable $y=f(x)=x^{1/2}$ after the transformation is obtained.

The lower part in FIG. 10 is a graph representing the frequency distribution of the variable y after the transformation. As shown, the frequency distribution of the variable y approximates a symmetrical, normal distribution.

Now, the interval statistic calculation portion 21 obtains the average $y_{ave}$ for the variable y and various statistics (standard deviation $y_\sigma$, confidence interval (y1, y2)) from the frequency distribution of the variable y.

Herein, since the frequency distribution of the variable y follows a normal distribution, the interval statistic calculation portion 21 can readily calculate a confidence interval (y1, y2) for a confidence level of 99.74% for example based on $y1=y_{ave}-3 \times y_\sigma$, and $y2=y_{ave}+3 \times y_\sigma$.

As shown in the lower part in FIG. 10, the confidence interval (y1, y2) calculated by the interval statistic calculation portion 21 substantially corresponds to the confidence level of 99.74%.

Then, the interval statistic calculation portion 21 obtains values produced by inverse-transforming ($f^{-1}$) the average and the statistics calculated based on the variable y as the average and statistics of the quality data x. For example, the interval statistic calculation portion 21 obtains $f^{-1}(y_{ave})=y_{ave}^2$ as the average of the quality data x. The interval statistic calculation portion 21 obtains $(f^{-1}(y1), f^{-1}(y2))$, in other words $(y1^2, y2^2)$ as the confidence interval of the quality data x.

In the upper part in FIG. 10, the broken line denotes the average and the upper and lower specification limits of the confidence interval produced by the interval statistic calculation portion 21 by inverse-transforming. As shown, the average produced by inverse-transformation by the interval statistic calculation portion 21 is located near the peak of the frequency distribution of the quality data x. The confidence interval produced by the interval statistic calculation portion 21 by the inverse-transformation has a shape wider on the right side having a long tail (where the quality data x has larger values), and narrower on the left side (where the quality data x has smaller values), and the confidence interval substantially corresponds to the desired confidence level of 99.74%.

Figure 11:
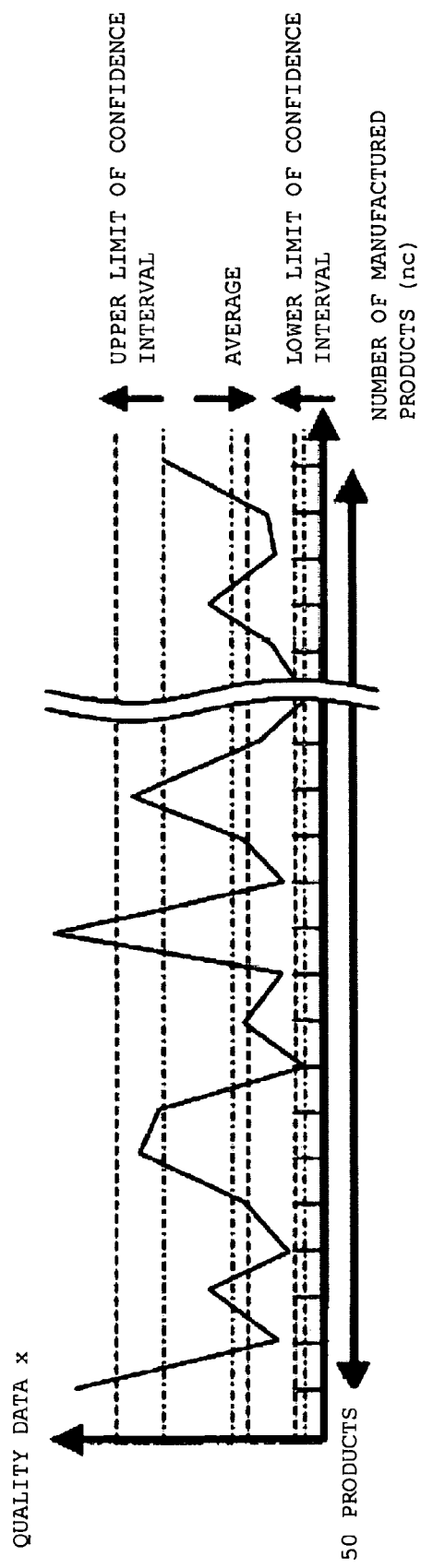
FIG. 11 is a graph showing the relation between quality data and a confidence interval.

FIG. 11 is a graph having quality data x of the 50 products shown in FIG. 10 plotted in the manufacturing order. In FIG. 11, the chain-dotted lines represent an average and a confidence interval (corresponding to the confidence level of 99.74%) produced from the frequency distribution of the quality data x assuming that the frequency distribution of the quality data x approximates a normal distribution. Meanwhile, the broken lines represent an average and the upper and lower limits of a confidence interval obtained by transforming the quality data x into a variable y and then inverse-transforming an average and the limits of a confidence interval obtained from the frequency distribution of the variable y that follows a normal distribution.

As can be seen from FIG. 11, the number of products outside the range of the confidence interval when the calculation is carried out by transformation of a variable and inverse-transformation is smaller than the number of products outside the range of the confidence interval produced assuming that the quality data x approximates a normal distribution. This is because the probability that products are included in the confidence interval calculated using the transformation of a variable and inverse-transformation is closer to the desired confidence level.

In this way, the manufacturing manager can correctly determine the relative qualities of the products or the trend of variation based on the displayed quality variation graph produced by plotting the average and statistics calculated using transformation of a variable and inverse-transformation for the interval width of 50 products.

Note that the power transformation has been described regarding the transformation of a variable and the inverse-transformation, but the transformation method is not limited to this method. A transformation method may be previously determined based on the property of quality data pieces so that the frequency distribution of the variable after the transformation further approximates a normal distribution. Then, the transformation method may be stored in the transformation method storing portion in association with the items of the quality data. The interval statistic calculation portion 21 may read out a transformation method corresponding to quality data from the transformation method storing portion, and obtain the average and various statistics according to the read out transformation method.

The blocks in the quality variation display device 10 may be implemented by hardware logic or software using a CPU as will be described in the following.

More specifically, the quality variation display device 10 includes a CPU that carries out instructions from a control program that enables various functions to be implemented, a ROM that stores the program, a RAM that expands the program, and a storage device (storage medium) such as a memory that stores the program and various kinds of data. The object of the invention can be achieved by providing the quality variation display device 10 with a storage medium storing the program codes (an executable program, an intermediate code program, and a source program) of a control program for the quality variation display device 10 as software to implement the above described functions in a computer-readable form, and by enabling a computer (a CPU or an MPU) to read out and carry out the program codes stored in the storage medium.

The storage medium may be for example a tape type medium such as a magnetic tape and a cassette tape, a disk type medium including a magnetic disk such as a flexible disk and a hard disk and an optical disk such as a CD-ROM, an MO, an MD, a DVD, and a CD-R, a card type medium such as an IC card (including a memory card) and an optical card, or a semiconductor memory type medium such as a mask ROM, an EPROM, an EEPROM, and a flash ROM.

The quality variation display device 10 may be provided in a manner connectable with a communication network, so that the program codes may be supplied through the communication network. The communication network is not limited to any specified network, and may be for example the Internet, an intranet, an extranet, a LAN, an ISDN, a VAN, a CATV communication network, a virtual private network, a telephone line network, a mobile communication network, or a satellite communication network. The transmission medium to form the communication network is not limited to any particular medium, and may be either in a wired manner such as IEEE 1394, a USB, an electric power line, a cable TV line, a telephone line, and ADSL or in a wireless manner such as infrared such as an IrDA and a remote, Bluetooth®, 802.11 radio, HDR, a mobile telephone network, satellite connection, and a digital terrestrial network. Note that the invention may be carried out by the program codes implemented in the form of electronically transmitted carrier waves or a data signal string.

The quality variation display device according to the invention may be applied to a quality display system that displays variation in the quality of products that are sequentially manufactured in a manufacturing process.

What is claimed is:

1. A quality variation display device displaying variation in a prescribed quality in a plurality of products manufactured by a manufacturing unit, comprising:

a quality data storing portion that stores the measurement result of each of the products measured at a measuring unit in association with the manufacturing order;

graph producing means for shifting an interval by a prescribed shift number of products, said interval corresponding to a prescribed number of products consecutive in the manufacturing order, obtaining a statistic for each of the intervals, thereby producing a graph in which the statistics are displayed at equal intervals in the manufacturing order;

a display portion that displays the graph produced by said graph producing means;

time information adding means for producing a measuring time axis based on said measuring time stored by said quality data storing portion and adding the measuring time axis to the graph produced by said graph producing means, wherein said measuring unit measures said prescribed quality in the manufacturing order, and said quality data storing means stores said measurement result in association with its measuring time;

a manufacturing data storing portion that stores manufacturing data having production condition information indicating a change in a production condition in said manufacturing unit and the occurrence time of the change in the production condition in association with each other or manufacturing data having operation content information indicating the content of operation at said manufacturing unit and the occurrence time of the operation in association with each other;

a required time storing portion that previously stores time required from the point of manufacturing at the manufacturing unit to the point of measuring at a measuring unit; and manufacturing data adding means for obtaining adjusted time produced by adding said required time stored by said required time storing portion to the occurrence time in said manufacturing data, and adding the production condition information or the operation content information to said graph based on the adjusted time and said measuring time axis.

2. The quality variation display device according to claim 1, where said time information adding means adds a scale at prescribed time intervals to said measuring time axis.

3. The quality variation display device according to claim 1, wherein a plurality of said manufacturing units are provided, said device further comprising a causality information storing portion that stores causality information to specify a manufacturing unit having a causal relation with said prescribed quality, and wherein said manufacturing data adding means adds only production condition information or operation content information corresponding to the manufacturing unit having a causal relation with said prescribed quality based on the causality information stored by said causality information storing portion.

4. The quality variation display device according to claim 1, further comprising parameter input means for accepting said number of products in each interval and said shift number as inputs and outputting the input number of products in the interval and the shift number to said graph producing means.

5. The quality variation display device according to claim 1, wherein said statistic is at least one of the average of measurement results of products included in each interval, the median of measurement results of products included in each interval, the standard deviation or variance of measurement results of products included in each interval, and a confidence interval in measurement results of products included in each interval.

6. The quality variation display device according to claim 1, wherein said quality variation graph producing means adds a line indicating at least one of the upper and lower specification limits for said prescribed quality to said quality variation graph.

7. A quality variation display device displaying variation in a prescribed quality in a plurality of products manufactured by a manufacturing unit, comprising:

a quality data storing portion that stores the measurement result of each of the products measured at a measuring unit in association with the manufacturing order;

graph producing means for shifting an interval by a prescribed shift number of products, said interval corresponding to a prescribed number of products consecutive in the manufacturing order, obtaining a statistic for each of the intervals, thereby producing a graph in which the statistics are displayed at equal intervals in the manufacturing order; and a display portion that displays the graph produced by said graph producing means, wherein said statistic is at least one of the average of measurement results of products included in each interval, the median of measurement results of products included in each interval, the standard deviation or variance of measurement results of products included in each interval, and a confidence interval in measurement results of products included in each interval, said statistic comprises said confidence interval, and said graph producing means produces said confidence interval by calculating prescribed transformation to the measurement results of the products so that its frequency distribution approximates a normal distribution, and calculating inverse-transformation to a transformation corresponding confidence interval for the measurement results after the transformation.

8. A method of displaying quality variation in a quality variation display device that displays variation in a prescribed quality in a plurality of products manufactured by a manufacturing unit, comprising:

a quality data storing step of storing a measurement result of each of the products measured by a measuring unit in association with the manufacturing order;

a graph producing step of shifting an interval by a prescribed shift number of products, said interval corresponding to a prescribed number of products consecutive in the manufacturing order, and obtaining a statistic for each of the intervals, thereby producing a graph in which the statistics are displayed at equal intervals in the manufacturing order; and a display step of displaying the graph produced by said graph producing means;

time information adding step of producing a measuring time axis based on said measuring time stored by said quality data storing step and adding the measuring time axis to the graph produced by said graph producing step, wherein said measuring unit measures said prescribed quality in the manufacturing order, and said quality data storing step stores said measurement result in association with its measuring time;

a manufacturing data storing step that stores manufacturing data having production condition information indicating a change in a production condition in said manufacturing unit and the occurrence time of the change in the production condition in association with each other or manufacturing data having operation content information indicating the content of operation at said manufacturing unit and the occurrence time of the operation in association with each other;

a required time storing step that previously stores time required from the point of manufacturing at the manufacturing unit to the point of measuring at a measuring unit; and manufacturing data adding step for obtaining adjusted time produced by adding said required time stored by said required time storing step to the occurrence time in said manufacturing data, and adding the production condition information or the operation content information to said graph based on the adjusted time and said measuring time axis.

9. A computer-readable storage medium that stores a quality variation display program enabling the quality variation display device according to claim 1 to operate, said program, when executed, enabling a computer to function as each of the means.

* * * * *